(12) United States Patent
Osogami

(10) Patent No.: US 12,017,646 B2
(45) Date of Patent: Jun. 25, 2024

(54) RISK SENSITIVE APPROACH TO STRATEGIC DECISION MAKING WITH MANY AGENTS

(71) Applicant: INTERNATIONAL BUSINESS MACHINES CORPORATION, Armonk, NY (US)

(72) Inventor: Takayuki Osogami, Yamato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 388 days.

(21) Appl. No.: 17/355,518

(22) Filed: Jun. 23, 2021

(65) Prior Publication Data

US 2022/0410878 A1 Dec. 29, 2022

(51) Int. Cl.
*B60W 30/00* (2006.01)
*B60W 30/09* (2012.01)
(Continued)

(52) U.S. Cl.
CPC ...... *B60W 30/09* (2013.01); *B60W 30/18109* (2013.01); *G06N 5/045* (2013.01); *G06N 7/01* (2023.01)

(58) Field of Classification Search
CPC .............. B60W 30/09; B60W 30/18109; G06N 5/045; G06N 7/01; G06N 3/006
See application file for complete search history.

(56) References Cited

U.S. PATENT DOCUMENTS

2019/0072959 A1* 3/2019 Palanisamy ............. G06N 7/01
2019/0266489 A1* 8/2019 Hu ........................ B60W 10/20
(Continued)

FOREIGN PATENT DOCUMENTS

WO WO-2022207087 A1 * 10/2022 ............. G06N 20/00

OTHER PUBLICATIONS

Hoen, P.J.'T., et al. "An Overview of Cooperative and Competitive Multiagent Learning", InInternational Workshop on Learning and Adaption in Multi-Agent Systems, Springer, Berlin, Heidelberg. Jul. 25, 2021, pp. 1-49.
(Continued)

*Primary Examiner* — Peter D Nolan
*Assistant Examiner* — Peter Y Ning
(74) *Attorney, Agent, or Firm* — Tutunjian & Bitetto, P.C.; Robert Richard Aragona

(57) ABSTRACT

A method is provided for choosing an action of an agent in a first team that competes against a second team. The method includes determining an action, based on first, second and third types of local payoff matrices. The method further includes performing the action. The determining step includes representing, by the first type of local payoff matrices, a payoff to the first team due to a pairwise interaction between agent teammates of the first team. The determining step further includes representing, by the second type of local payoff matrices, a payoff to the first team due to a pairwise interaction between agent opponents from the first team and the second team. The determining step also includes representing, by the third type of local payoff matrices, a payoff to the first team due to a pairwise interaction between agent teammates of the second team.

25 Claims, 7 Drawing Sheets

(51) Int. Cl.
  *B60W 30/18* (2012.01)
  *G06N 5/045* (2023.01)
  *G06N 7/01* (2023.01)

(56) References Cited

U.S. PATENT DOCUMENTS

| | | | |
|---|---|---|---|
| 2020/0143208 A1* | 5/2020 | Hernandez Leal | G06N 5/043 |
| 2020/0160168 A1* | 5/2020 | Yang | G06N 3/006 |
| 2020/0174471 A1* | 6/2020 | Du | G08G 1/0129 |
| 2020/0279136 A1* | 9/2020 | Subramanian | G06N 20/00 |
| 2021/0086798 A1* | 3/2021 | Saxena | G06N 3/08 |
| 2021/0271988 A1* | 9/2021 | Bouton | G06N 3/006 |
| 2023/0254214 A1* | 8/2023 | Suzuki | H04L 41/122 |
| | | | 709/223 |

OTHER PUBLICATIONS

Oliehoek, Frans A., et al. "Exploiting Structure in Cooperative Bayesian Games", arXiv preprint arXiv:1210.4886. Oct. 16, 2012, pp. 1-11.

Nowe, Ann, et al. "Game Theory and Multi-agent Reinforcement Learning", Reinforcement Learning: State of the Art, ISBN No. 10.1007/978-3-642-27645-3 14, Adaptation, Learning, and Optimization vol. 12, Springer. Jan. 2012, pp. 441-470.

Osogami, Takayuki, et al. "Real-time Tree Search with Pessimistic Scenarios", arXiv preprint arXiv:1902.10870. Jul. 14, 2019, pp. 1-14.

* cited by examiner

RISK SENSITIVE APPROACH TO STRATEGIC DECISION MAKING WITH MANY AGENTS

BACKGROUND

The present invention generally relates to reinforcement learning, and more particularly to a risk sensitive approach to strategic decision making with many agents. In strategic decision making, each player seeks to find the strategy (probability distribution over the actions) that maximizes his/her own expected payoff, where the optimum strategy depends on the strategies of other players. For example, each player is a company who decides the amount of investment to each product or service so as to maximize the expected profit. Another example is an autonomous robot, which moves around an unknown environment, which may be modeled as a strategic component.

Prior art solutions exist for computing good strategies for the case where a team of collaborative agents competes against another team of collaborative agents. However, the number of actions n grows exponentially with the number of agents m. As such, such prior art solutions cannot be applied in practice when the number of agents m is large.

SUMMARY

According to aspects of the present invention, a computer-implemented method is provided for choosing an action of an agent in a first team that competes against a second team by a multi-agent system. The method includes determining, by a computing device, an action, based on first, second and third types of local payoff matrices. The method further includes performing the action, by a hardware device operatively coupled to the computing device. The determining step includes representing, by the first type of local payoff matrices, a payoff to the first team due to a pairwise interaction between agent teammates of the first team. The determining step further includes representing, by the second type of local payoff matrices, a payoff to the first team due to a pairwise interaction between agent opponents from the first team and the second team. The determining step also includes representing, by the third type of local payoff matrices, a payoff to the first team due to a pairwise interaction between agent teammates of the second team.

According to other aspects of the present invention, computer-implemented method is provided for choosing an action of an agent in a first team that competes against a second team. The method includes determining, by a computing device, an action based on first $F^{i,i'}(a, a')$, second $G^{i,j}(a, b)$ and third $H^{j,j'}(b, b')$ types of local payoff matrices. The method further includes performing the action, by a hardware device operatively coupled to the computing device. The determining step includes representing, by the first type of local payoff matrices $F^{i,i'}(a,a')$, a first payoff to the first team due to an interaction between an agent i taking an action a ∈ A and agent i' taking an action a'∈A in the first team, with A being a set of actions that can be taken by first team agents. The determining step further includes representing, by the second type of local payoff matrices $G^{i,j}(a, b)$, a second payoff to the first team due to an interaction between an agent i taking an action a ∈ A in the first team and an agent j taking an action b∈B in the second team, with B being a set of actions that can be taken by second team agents. The determining step also includes representing, by the third type of local payoff matrices $H^{j,j'}(b, b')$, a third payoff to the first team due to an interaction between an agent j taking an action b∈B and agent j' taking an action b'∈B in the second team.

According to yet other aspects of the present invention, a computer program product is provided for choosing an action of an agent in a first team that competes against a second team by a multi-agent system. The computer program product includes a computer readable storage medium having program instructions embodied therewith. The program instructions are executable by a computer to cause the computer to perform a method. The method includes determining, by the computer, an action, based on first, second and third types of local payoff matrices. The method further includes performing the action, by a hardware device operatively coupled to the computer. The determining step includes representing, by the first type of local payoff matrices, a payoff to the first team due to a pairwise interaction between agent teammates of the first team. The determining step further includes representing, by the second type of local payoff matrices, a payoff to the first team due to a pairwise interaction between agent opponents from the first team and the second team. The determining step also includes representing by the third type of local payoff matrices, a payoff to the first team due to a pairwise interaction between agent teammates of the second team.

According to still other aspects of the present invention, a computer program product is provided for choosing an action of an agent in a first team that competes against a second team by a reinforcement learning system, the computer program product comprising a computer readable storage medium having program instructions embodied therewith, the program instructions executable by a computer to cause the computer to perform a method. The method includes determining, by a computing device, an action based on first $F^{i,i'}(a, a')$, second $G^{i,j}(a, b)$ and third $H^{j,j'}(b, b')$ types of local payoff matrices. The method further includes performing the action, by a hardware device operatively coupled to the computing device. The determining step includes representing, by the first type of local payoff matrices $F^{i,i'}(a, a')$, a first payoff to the first team due to an interaction between an agent i taking an action a∈A and agent taking an action a'∈A in the first team, with A being a set of actions that can be taken by first team agents. The determining step further includes representing, by the second type of local payoff matrices $G^{i,j}(a, b)$, a second payoff to the first team due to an interaction between an agent i taking an action a∈A in the first team and an agent j taking an action b∈B in the second team, with B being a set of actions that can be taken by second team agents. The determining step also includes representing, by the third type of local payoff matrices $H^{j,j'}(b, b')$, a third payoff to the first team due to an interaction between an agent j taking an action b∈B and agent j' taking an action b'∈B in the second team.

According to further aspects of the present invention, a computer processing system is provided for choosing an action of an agent in a first team that competes against a second team by a multi-agent system. The computer processing system includes a memory for storing program code. The computer processing system further includes a processor device for running the program code to determine an action based on first $F^{i,i'}(a, a')$, second $G^{i,j}(a, b)$ and third $H^{j,j'}(b, b')$ types of local payoff matrices. The processor device further runs the program code to send instructions to a hardware device operating coupled to the computer processing system to control the hardware device to perform the action. The processor device further runs the program code to represent, by the first type of local payoff matrices $F^{i,i'}(a, a')$, a first payoff to the first team due to an interaction between an agent i taking an action $a \in A$ and agent taking an action $a' \in A$ in the first team, with A being a set of actions that can be taken by first team agents. The processor device also runs the program code to represent, by the second type of local payoff matrices $G^{i,j}(a, b)$, a second payoff to the first team due to an interaction between an agent i taking an action $a \in A$ in the first team and an agent j taking an action $b \in B$ in the second team, with B being a set of actions that can be taken by second team agents. The processor device additionally runs the program code to represent, by the third type of local payoff matrices $H^{j,j'}(b, b')$, a third payoff to the first team due to an interaction between an agent j taking an action $b \in B$ and agent j' taking an action $b' \in B$ in the second team.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to a risk sensitive approach to strategic decision making with many agents.

In embodiments of the present invention, decisions are made on the basis of local payoff matrices that represent pairwise interactions between agents instead of the standard (global) payoff matrix. From the relation between the global and local payoff matrices, approximate strategies for the proposed objective are derived. The resulting strategies are risk-averse in that they tend to give opponents little room to effectively counterattack and risk-seeking in that they tend to give teammates a room to create synergistic effects.

Embodiments of the present invention are directed to determining and performing an action based on local payoff matrices, namely first, second and third types of local payoff matrices. The first type of local payoff matrices represents a payoff to the first team due to a pairwise interaction between agent teammates of the first team. The second type of local payoff matrices represents a payoff to the first team due to a pairwise interaction between agent opponents from the first team and the second team. The third type of local payoff matrices represents a payoff to the first team due to a pairwise interaction between agent teammates of the second team.

The use of these three types of matrices allows for embodiments of the present invention to find good strategy efficiently for the case where the number of agents is large (e.g., larger than a threshold number of agents). An exemplary number which may be considered to be a large number of agents is a total of at least 4 agents in both teams. Of course, the present invention can be applied to cases with any number of agents, including less that the preceding amount, while providing a strategic decision.

Figure 1:
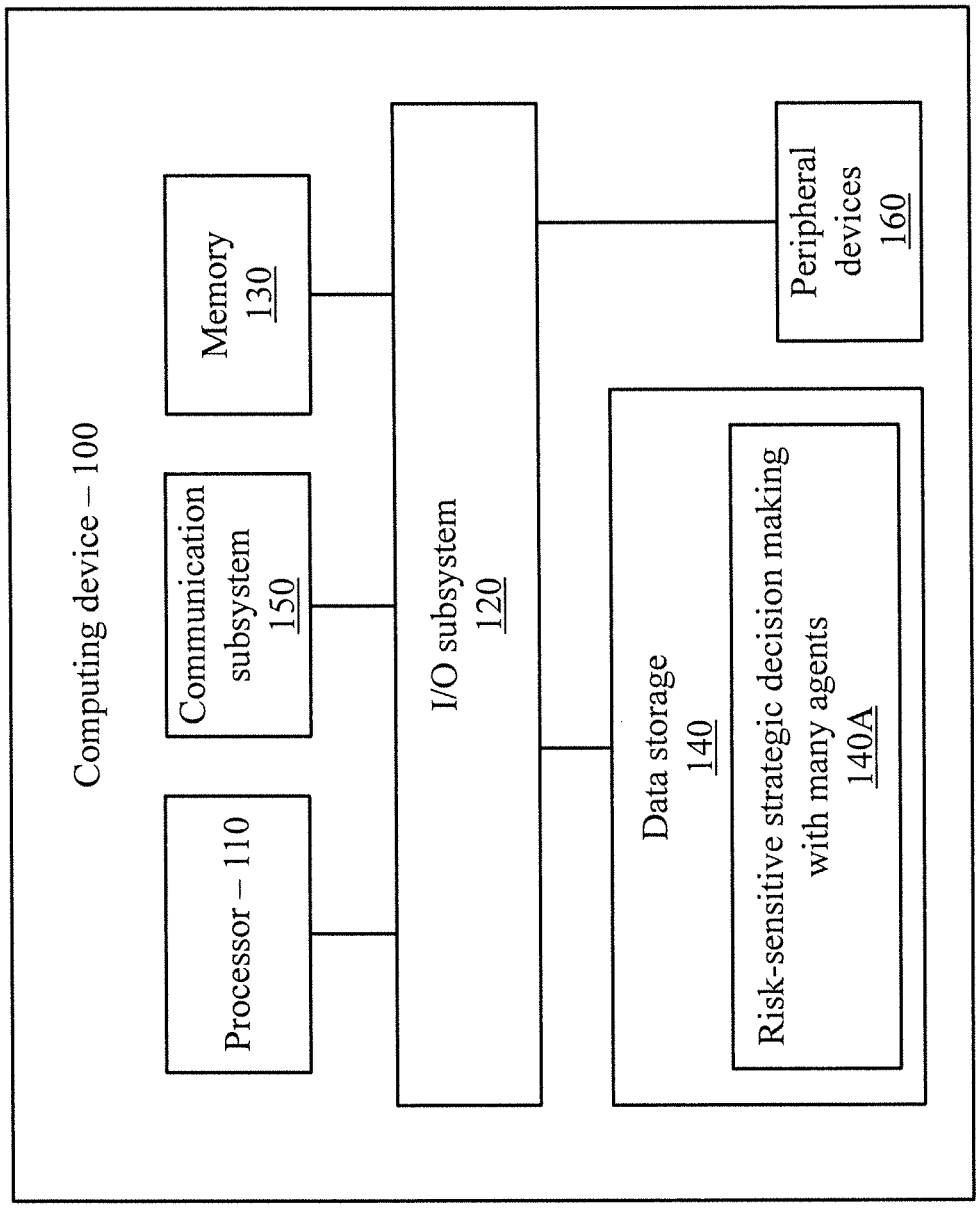
FIG. 1 is a block diagram showing an exemplary computing device 100 in accordance with an embodiment of the present invention.

FIG. 1 is a block diagram showing an exemplary computing device 100, in accordance with an embodiment of the present invention. The computing device 100 is configured to perform risk-sensitive strategic decision making with many agents.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for risk-sensitive strategic decision making with many agents. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 7-8). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
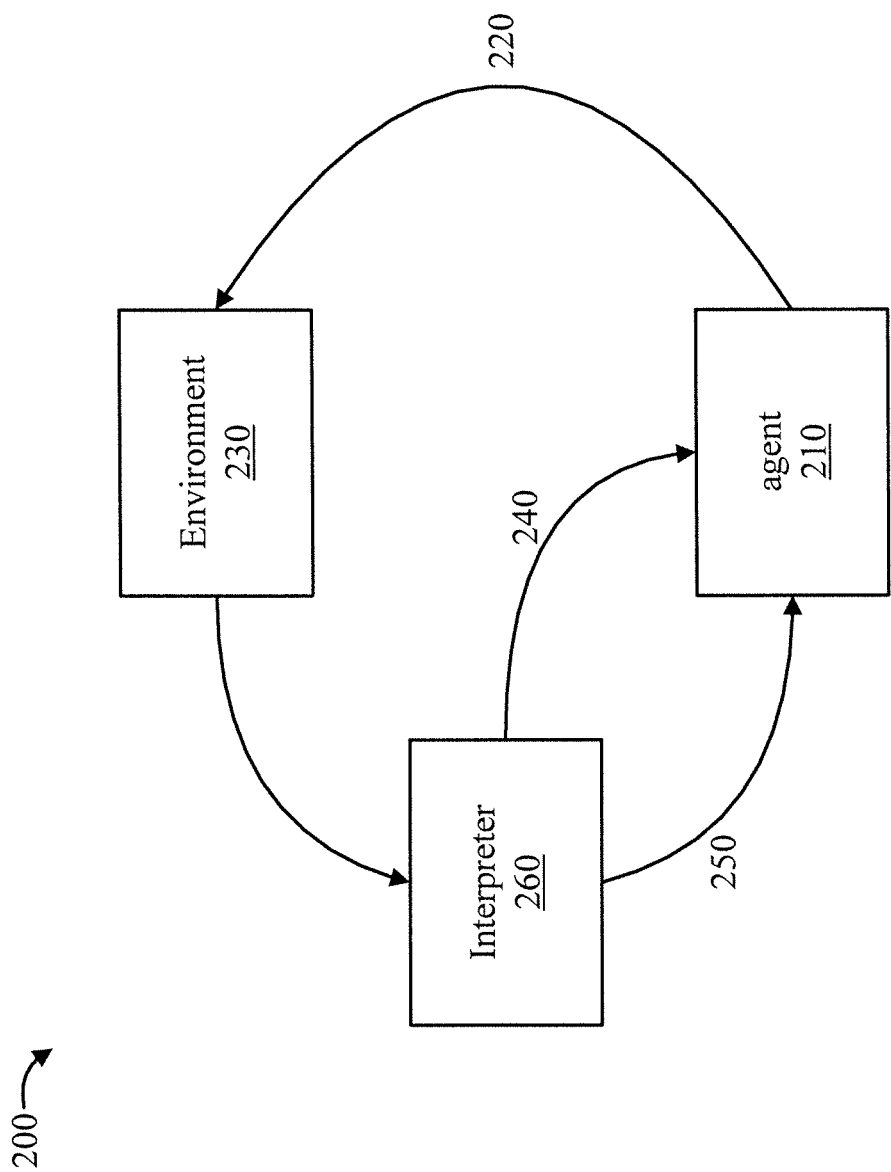
FIG. 2 is a block diagram showing an overall exemplary Reinforcement Learning (RL) architecture, in accordance with an embodiment of the present invention.

These and other variations of a hardware processor subsystem are also contemplated in accordance with embodiments of the present invention FIG. 2 is a block diagram showing an overall exemplary Reinforcement Learning (RL) architecture 200, in accordance with an embodiment of the present invention.

The typical framing of a Reinforcement Learning (RL) scenario: an agent 210 takes actions 220 in an environment 230, which is interpreted by an interpreter 260 into a reward 240 and a representation of the state 250, which are fed back to the agent 210. The RL scenario here is specifically applied using a risk sensitive approach to many-agent decision making as described in further detail herein. In an embodiment, pairwise agent interactions between the same and opposing teams are used to form matrices from which a strategic decision is made.

Figure 3:
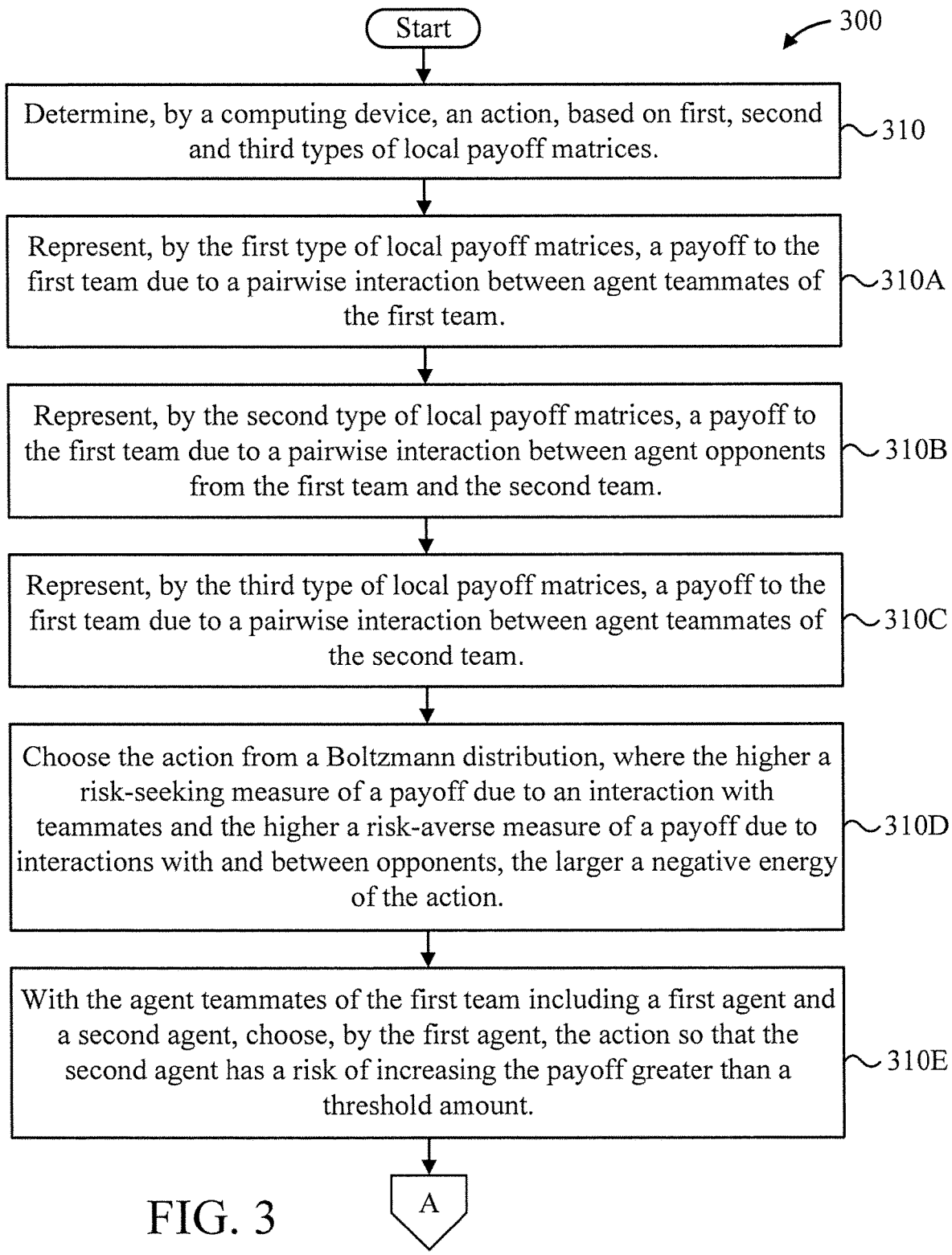
FIGS. 3-4 are flow diagrams showing an exemplary method for choosing an action of an agent in a first team that competes against a second team by a reinforcement learning system, in accordance with an embodiment of the present invention.
Figure 4:
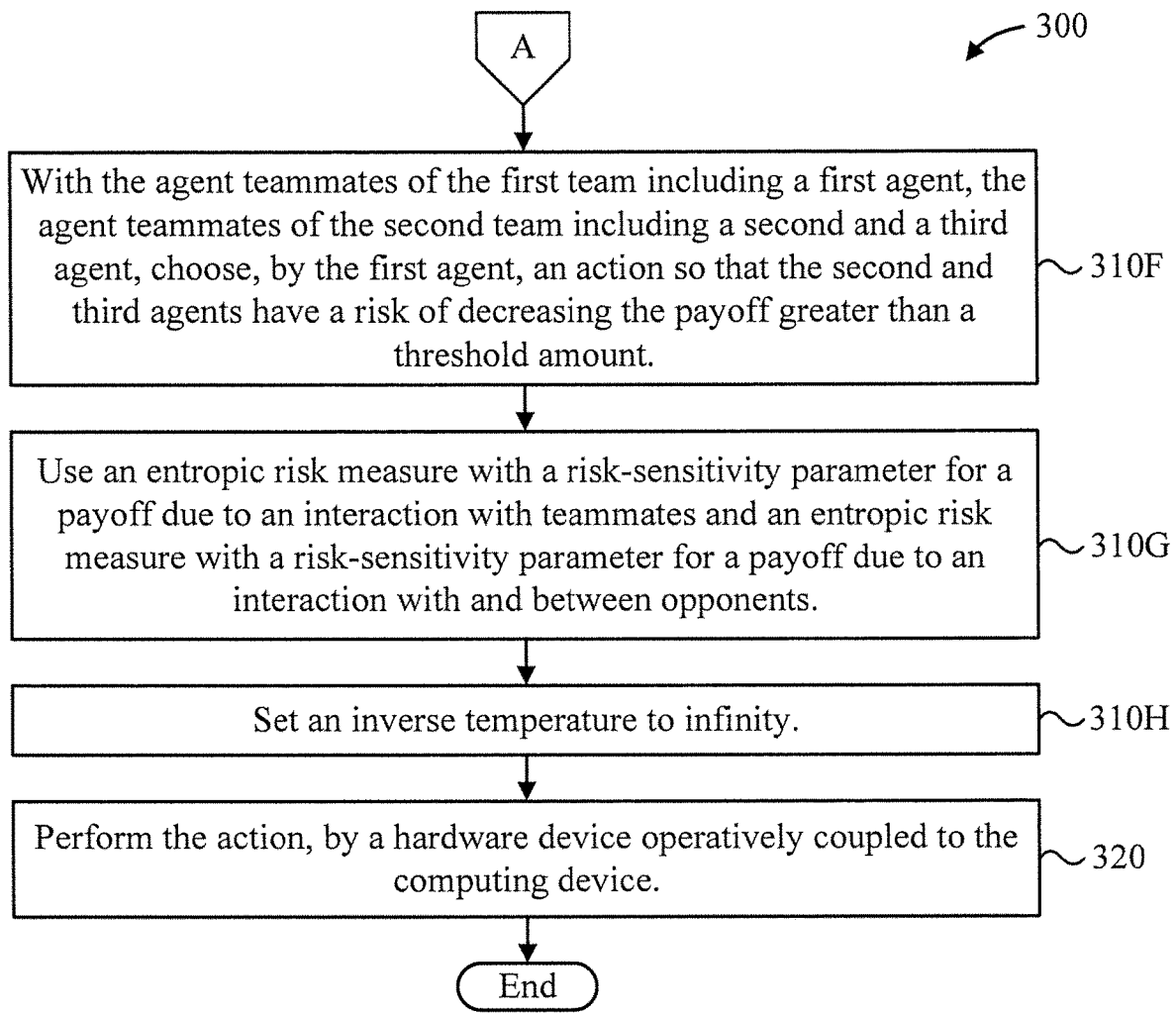

FIG. 3 is a flow diagram showing an exemplary method 300 for choosing an action of an agent in a first team that competes against a second team by a reinforcement learning system, in accordance with an embodiment of the present invention.

At block 310, determine, by a computing device, an action, based on first, second and third types of local payoff matrices.

The matrices are further described in blocks 310A, 310B, and 310C, respectively.

In an embodiment, block 310 can include one or more of blocks 310A through 310C.

At block 310A, represent, by the first type of local payoff matrices, a payoff to the first team due to a pairwise interaction between agent teammates of the first team.

At block 310B, represent, by the second type of local payoff matrices, a payoff to the first team due to a pairwise interaction between agent opponents from the first team and the second team.

At block 310C, represent, by the third type of local payoff matrices, a payoff to the first team due to a pairwise interaction between agent teammates of the second team.

At block 310D, choose the action from a Boltzmann distribution, where the higher a risk-seeking measure of a payoff due to an interaction with teammates and the higher a risk-averse measure of a payoff due to interactions with and between opponents, the larger a negative energy of the action. "A payoff due to an interaction with and between opponents" can mean any of the following: (1) the payoff that can be associated with the interaction between myself (the decision maker using the invention) and each of my teammates; (2) the payoff that can be associated with the interaction between myself (the decision maker using the invention) and each of my opponents; and (3) the payoff that can be associated with the interaction between each pair of my opponents.

At block 310E, with the agent teammates of the first team including a first agent and a second agent, choose, by the first agent, the action so that the second agent has a risk of increasing the payoff greater than a threshold amount.

At block 310F, with the agent teammates of the first team including a first agent, the agent teammates of the second team including a second and a third agent, choose, by the first agent, an action so that the second and third agents have a risk of decreasing the payoff greater than a threshold amount.

At block 310G, use an entropic risk measure with a risk-sensitivity parameter for a payoff due to an interaction with teammates and an entropic risk measure with a risk-sensitivity parameter for a payoff due to an interaction with and between opponents.

At block 310H, set an inverse temperature to infinity.

At block 320, perform the action, by a hardware device operatively coupled to the computing device.

Figure 5:
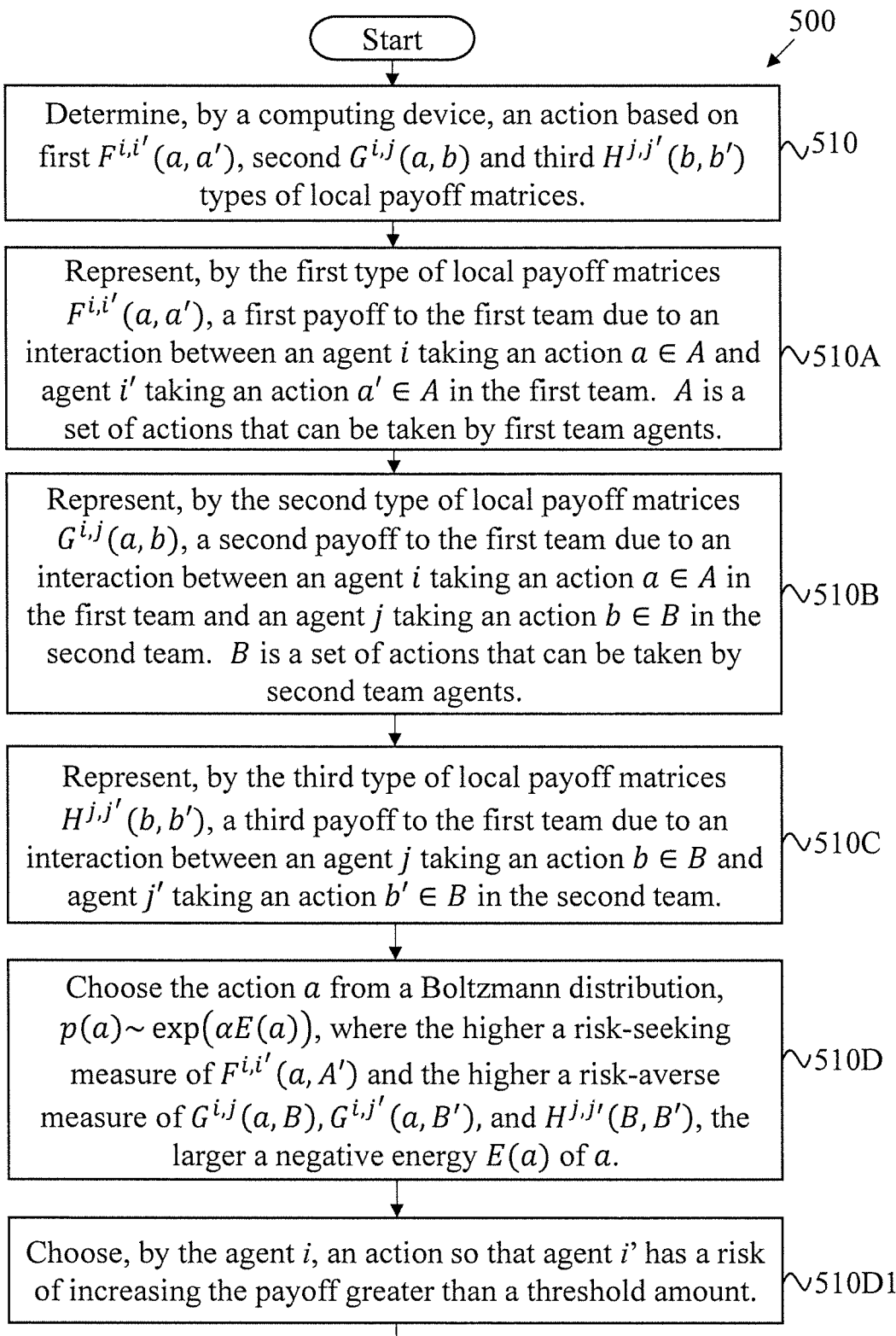
FIGS. 5-6 are flow diagrams showing another exemplary method for choosing an action of an agent in a first team that competes against a second team by a reinforcement learning system, in accordance with an embodiment of the present invention.
Figure 5:
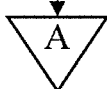
Figure 6:
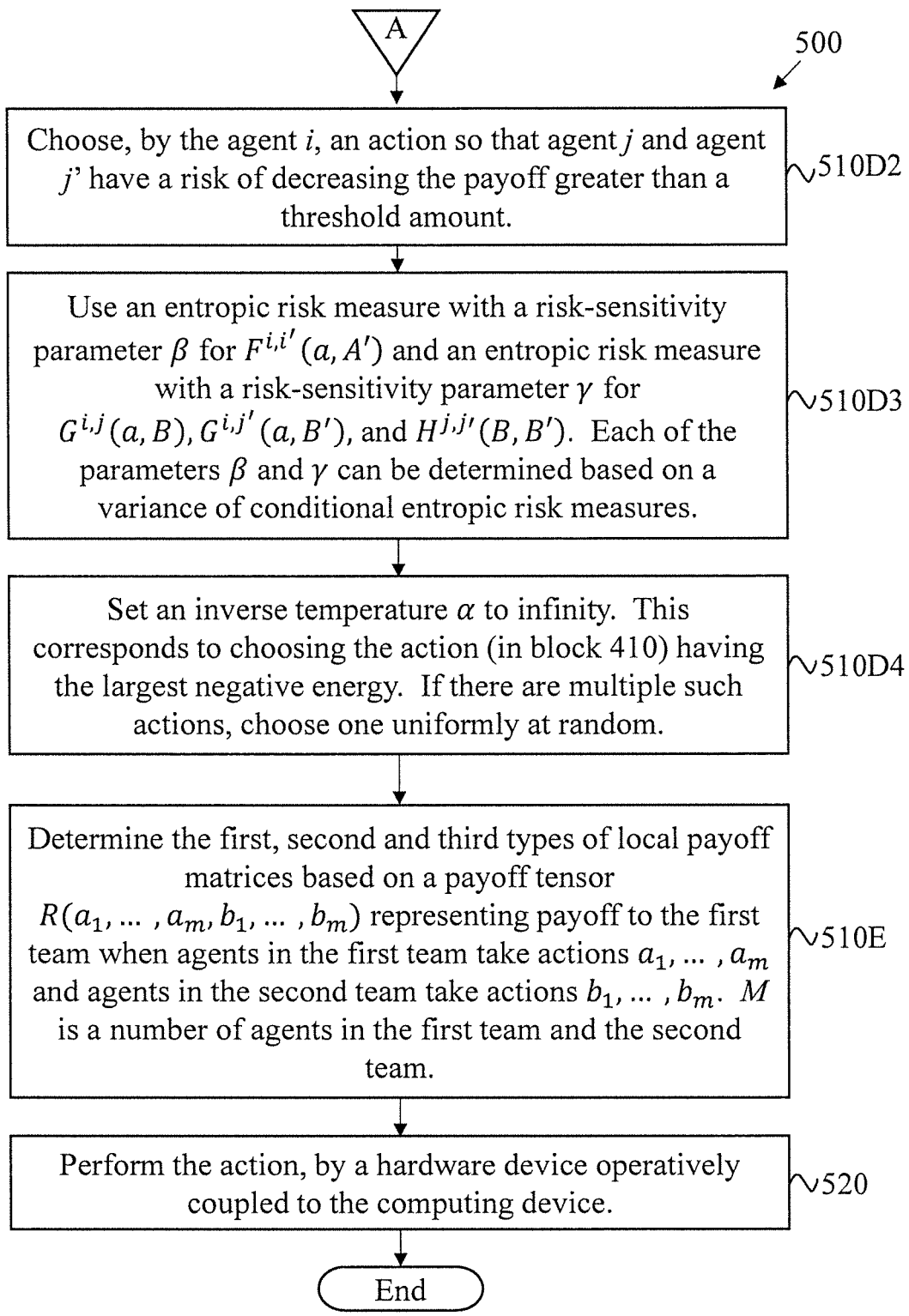

FIGS. 5-6 are flow diagrams showing another exemplary method 500 for choosing an action of an agent in a first team that competes against a second team by a reinforcement learning system, in accordance with an embodiment of the present invention.

At block 510, determine, by a computing device, an action based on first $F^{i,i'}(a, a')$, second $G^{i,j}(a, b)$ and third $H^{j,j'}(b, b')$ types of local payoff matrices.

The matrices are further described in blocks 510A, 510B, and 510C, respectively.

In an embodiment, block 510 can include one or more of blocks 510A through 510E.

At block 510A, represent, by the first type of local payoff matrices (a, a'), a first payoff to the first team due to an interaction between an agent i taking an action a ∈ A and agent taking an action a'∈ A in the first team. A is a set of actions that can be taken by first team agents.

At block 510B, represent, by the second type of local payoff matrices $G^{i,j}(a, b)$, a second payoff to the first team due to an interaction between an agent i taking an action a ∈ A in the first team and an agent j taking an action b∈ B in the second team. B is a set of actions that can be taken by second team agents.

At block 510C, represent, by the third type of local payoff matrices $H^{j,j'}(b, b')$, a third payoff to the first team due to an interaction between an agent j taking an action b ∈ B and agent j' taking an action b'∈ B in the second team.

At block 510D, choose the action a from a Boltzmann distribution, p(a)~exp(αE(a)), where the higher a risk-seeking measure of $F^{i,i'}(a, A')$ and the higher a risk-averse measure of $G^{i,j}(a, B)$, $G^{i,j'}(a, B')$, and $H^{j,j'}(B,B')$, the larger a negative energy E (a) of a. A' is the random action of a teammate. Each of B and B' is the random action of an opponent.

As an example, using the entropic risk measure $$ERM_\lambda[X] \equiv -\frac{1}{\lambda}\log E[\exp(-\lambda X)]$$

for a random variable X, $$p(a) \sim \exp\left(\alpha\left(\sum_{i' \neq i} ERM_{-\beta}[F^{i,i'}(a, A')] + \sum_{j,j'} ERM_\gamma\left[\frac{1}{m-1}(G^{i,j}(a, B) + G^{i,j'}(a, B')) + \frac{1}{m}H^{j,j'}(B, B')\right]\right)\right)$$

At block 510D1, choose, by the agent i, an action so that agent i' has a risk of increasing the payoff greater than a threshold amount.

At block 510D2, choose, by the agent i, an action so that agent j and agent j' have a risk of decreasing the payoff greater than a threshold amount.

At block 510D3, use an entropic risk measure with a risk-sensitivity parameter β for $F^{i,i'}(a, A')$ and an entropic risk measure with a risk-sensitivity parameter γ for $G^{i,j}(a, B)$, $G^{i,j'}(a, B')$, and $H^{j,j'}(B, B')$. In an embodiment, each of the parameters β and γ can be determined based on a variance of conditional entropic risk measures.

At block 510D4, set an inverse temperature α to infinity. This corresponds to choosing the action (in block 510) having the largest negative energy. If there are multiple such actions, choose one uniformly at random.

At block 510E, determine the first, second and third types of local payoff matrices based on a payoff tensor $R(a_1, \ldots, a_m, b_1, \ldots, b_m)$ representing payoff to the first team when agents in the first team take actions $a_1, \ldots, a_m$ and agents in the second team take actions $b_1, \ldots, b_m$. M is a number of agents in the first team and the second team.

At block 520, perform the action, by a hardware device operatively coupled to the computing device. The action can be control of a valve, a vehicle, a robot, a hardware machine, and so forth as readily appreciated by one of ordinary skill in the art. A description of an exemplary environment relating to an Advanced Driver Assistance System is provided below with respect to FIG. 6.

Figure 7:
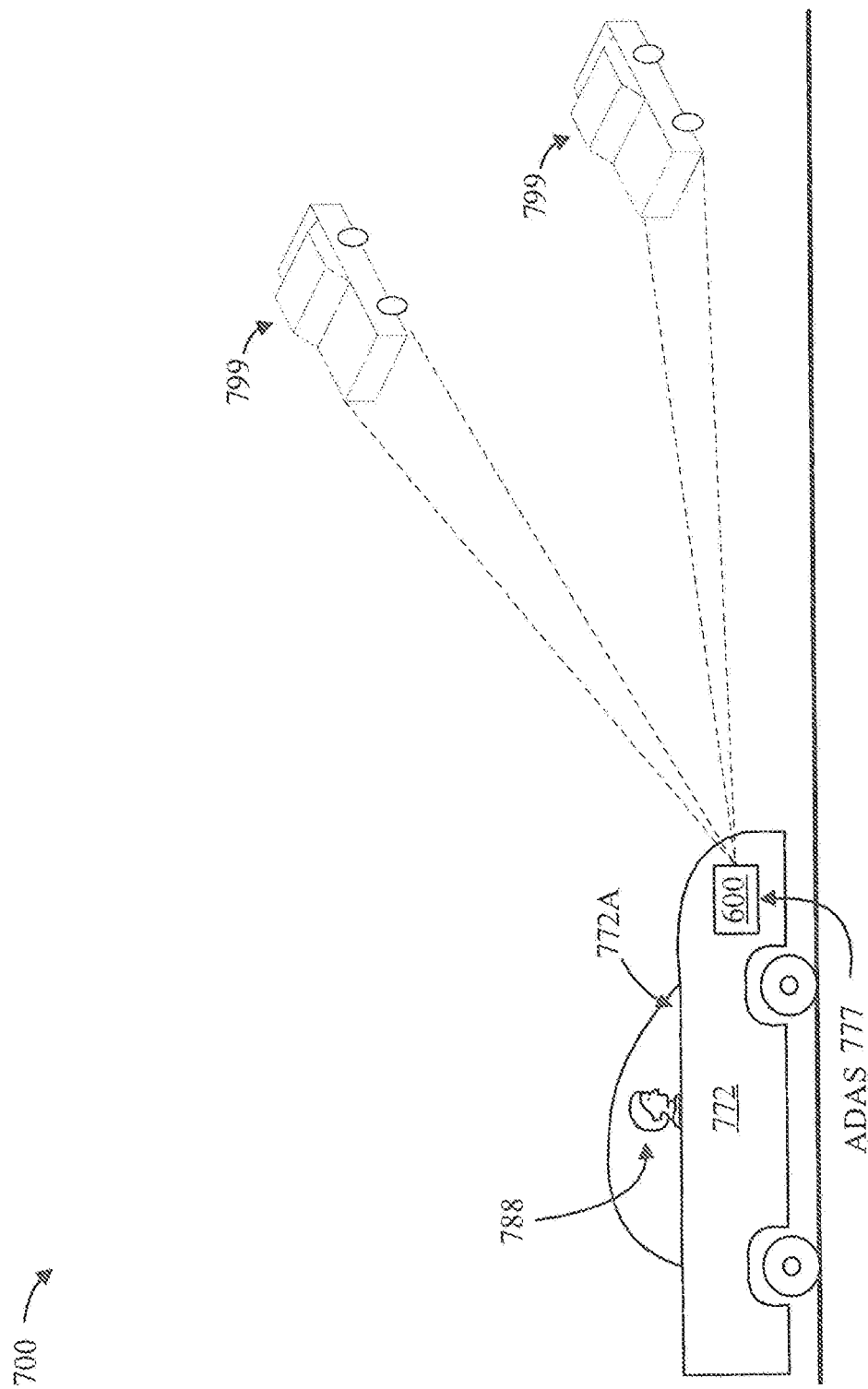
FIG. 7 is a block diagram showing an exemplary environment to which the present invention can be applied, in accordance with an embodiment of the present invention.

FIG. 7 is a block diagram showing an exemplary environment 700 to which the present invention can be applied, in accordance with an embodiment of the present invention.

In the environment 700, a user 788 is located in a scene with multiple objects 799, each having their own locations and trajectories. The user 788 is operating a vehicle 772 (e.g., a car, a truck, a motorcycle, etc.) having an ADAS 777.

The ADAS 777 calculates first, second, and third types of payoff matrices based on agent interactions between agents of the same team and opposing teams as described herein with respect to the payoff matrices.

Responsive to the three matrices, a risk-sensitive many-agent strategic decision is made. To that end, the ADAS 777 can control, as an action corresponding to a decision, for example, but not limited to, steering, braking, and accelerating systems. Each of these systems can be considered to be an agent. A steering system can be on the same team as either a braking system or an accelerating system, while a braking system and an accelerating system are on opposing teams. Steering can even be partitioned to left steering (one team) versus right steering (another team). Such configurations are readily understood by one of ordinary skill in the art, and can include more systems and/or inputs as agents, as the invention is particularly suited to cases involving many agents as noted herein.

It is to be appreciated that the key here is not forming agent pairs or even triples but the more agents in play the better the results of the present invention over conventional approaches that result in an inordinate number of actions due to the number of actions growing exponentially with the number of agents unlike in embodiments of the present invention. Thus, in an ADAS situation, steering, accelerating/braking, friction (or lack of friction), yaw rate, lighting (hazards, high beam flashing, etc.), tire pressure, turn signaling, and more can all be efficiently exploited in an optimized decision in accordance with the present invention.

The system of the present invention (e.g., system 600) may interface with the user through one or more systems of the vehicle 772 that the user is operating. For example, the system of the present invention can provide the user information through a system 772A (e.g., a display system, a speaker system, and/or some other system) of the vehicle 772. Moreover, the system of the present invention (e.g., system 600) may interface with the vehicle 772 itself (e.g., through one or more systems of the vehicle 772 including, but not limited to, a steering system, a braking system, an acceleration system, a steering system, a lighting (turn signals, headlamps) system, etc.) in order to control the vehicle and cause the vehicle 772 to perform one or more actions. In this way, the user or the vehicle 772 itself can navigate around these objects 799 to avoid potential collisions there between. The providing of information and/or the controlling of the vehicle can be considered actions that are determined in accordance with embodiments of the present invention.

Risk-Sensitive Approach to Strategic Decision Making

Consider two-player zero-sum games where players simultaneously choose (mixed) strategies. The goal of player 1 is to maximize the expected payoff, while player 2 seeks to minimize it. Let $r_{a,b}$ be the (expected) payoff to player 1 when player 1 takes an action $a \in \mathcal{A}$, and player 2 takes an action $b \in \mathcal{B}$.

Player 1's strategy at a Nash equilibrium can be given by $$\arg\max_p \min_q \mathbb{E}^{p,q}[r_{A,B}], \quad (1)$$

where a random variable A is used to denote the random action of player 1 with distribution $p \in \Delta(\mathcal{A})$ and B with distribution $q \in \Delta(\mathcal{B})$ for player 2. Throughout, $\Delta(\Lambda)$ denotes the space of probability vectors on a set $\Lambda$. For $a \in \mathcal{A}$, p(a) is written to denote the probability of a defined with p. The optimization problem (1) can be solved for example with linear program (LP)[1].

Proposed Approach

Since solving (1) is computationally expensive with large action space, the solution is proposed as follows:

$$\arg\max_p \left\{ \mathbb{E}^p \left[ \min_q \left\{ \mathbb{E}^q[r_{A,B} \mid A] + \frac{1}{\gamma} KL(q\|q_0) \right\} \right] - \frac{1}{\alpha} - KL(p\|p_0) \right\} \quad (2)$$

where KL denotes the KL divergence; $\gamma$ and $\alpha$ are hyperparameters, which will be discussed in the following; $q_0$ is a nominal distribution, whose support includes the support of any distribution $q \in \Delta(\mathcal{B})$ (i.e., any $q \in \Delta(\mathcal{B})$ is absolutely continuous with respect to $q_0$); $p_0$ is a nominal distribution such that any $p \in \Delta(\mathcal{A})$ is absolutely continuous with respect to $p_0$. To obtain (2) from (1), three modifications have been made, which will be elaborated in the following.

First, in (2), q is chosen to minimize the conditional expectation of the payoff to player 1 given the action of player 1. This means that player 2 is allowed to choose the strategy with the knowledge of the action taken by player 1 as if they play a Stackelberg game. Player 2 is thus more adversarial to player 1, and in fact this is likely to be too pessimistic to player 1.

The second modification mitigates the power of player 2 by giving a penalty if his strategy q is deviated from $q_0$. Namely, the strategy of player 2 is allowed to depend on the action of player 1 but constrained to be close to $q_0$. Without any information, the present invention uses the uniform distribution as $q_0$ (then KL $(q\|q_0)$ is the negative entropy of q plus log $|\mathcal{B}|$). If there is some knowledge about the behavior of player 2 for example from opponent modeling, the present invention may use other suitable $q_0$.

The purpose of the third modification is to make the action of player 1 less predictable to player 2. With the first two modifications alone, there exists a pure (deterministic) strategy that is optimal to player 1. Namely, player 1 should choose the $a \in \mathcal{A}$ that maximizes $$\min_q \mathbb{E}^q[r_{A,B}] + \frac{1}{\gamma} KL(q\|q_0),$$

but such player 1 can be easily exploited. In particular, if player 2 knows that player 1 is making decisions on the basis of (2), then player 2 can infer the action to be taken by player 1 and thus can optimize his action to that particular action. By letting $p_0$ be uniform, such predictable strategy can be penalized.

The primary advantage of the new formulation (2) is that its optimal solution can be expressed in a simple analytic form, which is characterized in the following theorem:

Risk-Sensitive Approach to Many Agents

Here, the setting is considered where a team of agents competes against another, and the agents in each team collaborate with each other to maximize the payoff to the team. Let m be the number of agents in the first team, and n in the second team. The strategies of the agents in the first team at a Nash equilibrium can be given by $$\arg\max_p \min_q \mathbb{E}^{p,q}[r_{A,B}], \quad (3)$$

where $A=(A_1, \ldots, A_m)$ denotes the random actions of the agents in the first team, and $B=(B_1, \ldots, B_n)$ in the second team. Here, p is the joint distribution of A, and q is of B.

Local Payoff Matrices

To deal with the exponentially large spaces of A and B, the following assumption on the structure of the payoff matrix is made:

Assumption 1. The payoff matrix $(r_{a,b})_{a,b} \in \Delta^{m \times B^n}$ can be decomposed into local payoff matrices such that $$r_{a,b} = \frac{1}{2}\left( \sum_{i,i'|i' \neq i} f_{a_i a_{i'}}^{i,i'} + 2\sum_{i,j} g_{a_i,b_j}^{i,j} + \sum_{j,j'|j' \neq j} h_{b_j,b_{j'}}^{j,j'} \right) \quad (4)$$

$$= \frac{1}{2}(f(a) + g(a, b) + h(b)) \quad (5)$$

where $f_{a',a}^{i',i}=f_{a,a'}^{i,i'}$ for $<i'<i$ and $h_{b',b}^{j',j}=h_{b,b'}^{j,j'}$, for $j'<j$, so that the payoff matrix is decomposed into essentially ½(m+n)(m+n−1) local payoff matrices. Note that $f(a) \equiv \sum_{i,i'|i' \neq i} f_{a_i,a_{i'}}^{i,i'}$, $g(a,b) \equiv 2\sum_{i,j} g_{a_i,b_j}^{i,j}$, $h(b) \equiv \sum_{j,j'|j' \neq j} h_{b_j,b_{j'}}^{j,j'}$, and the summation with respect to i, i'|i'≠i is over all pairs (i,i')∈ [1, n]² except those with i=i'. Other summations are defined analogously.

Here, $f_{a,a'}^{i,i'}$ (respectively, $h_{b,b'}^{j,j'}$) is interpreted as the payoff for the first team due to interaction between agent i and agent in the first team (respectively, j and j' in the second team), where the former agent takes action a (respectively, b), and the latter agent takes action a'(respectively, b'). Likewise, $g_{a,b}^{i,j}$ is interpreted as the payoff to the first team due to interaction between agent i, taking action a, in the first team and agent j, taking action b, in the second team.

The exact decomposition does not exist in general, and one may consider the decomposition as approximation. It is assumed that the local payoff matrices are directly given or estimated, although one could also decompose a given r. One possible approach of decomposition is to obtain a least square solution possibly with regularization.

Thus, a more efficient approach of directly giving local payoff matrices is studied. Namely, let $$f^{i,i'} = \underset{axis \notin \{i,i'\}}{\text{average }} r, \quad g^{i,j} = \underset{axis \notin \{i, m+j\}}{\text{average }} r, \quad h^{j,j'} = \underset{axis \notin \{m+j, m+j'\}}{\text{average }} r, \quad (6)$$

where "average$_{axis \notin \{i,i'\}}$r" denotes the $|\mathcal{A}| \times |\mathcal{A}|$ matrix that is obtained from the payoff matrix r, which may be seen as a tensor of the (m+n)-th order, by taking the average along all dimensions except the i-th and i'-th dimension. For a given instance of a game, it is often the case that these local payoff matrices can be given directly from their definitions in (6) without the need for computing the averages from r. It is in fact necessary to obtain the local payoff matrices directly from the instance of a game, particularly when r does not fit in the main memory.

In practice, one may replace the averages in (6) with corresponding sample averages. Namely, instead of taking the average over all combinations, one may take the average over samples of combinations. When games are not given in advance and need to be learned from experiences, the local payoff matrices should also be estimated by such sample averages.

Deriving risk-sensitive strategies.

With Assumption 1, (3) can be rewritten as follows:

$$\max_{p} \min_{q} \mathbb{E}^{p,q}[r_{A,B}] = \frac{1}{2} \max_{p} \min_{q} \mathbb{E}^{p,q}[f(A) + g(A, B) + h(B)], \quad (7)$$

To this expression, the present invention repeatedly applies the transformations that are analogous to those introduced above.

First, adversarial strategies of a hypothetical second team are considered to obtain a lower bound of $\min_{q} \mathbb{E}^{p,q}[r_{A,B}]$.

$$\min_{q} \mathbb{E}^{p,q}[r_{A,B}] \geq \frac{1}{2} \mathbb{E}^{p}\left[\min_{q} \mathbb{E}^{q}[f(A) + g(A, B) + h(B) \mid A]\right] \quad (8)$$

$$= \frac{1}{2} \mathbb{E}^{p}\left[f(A) + \min_{q} \mathbb{E}^{q}\left[2\sum_{i,j} g^{i,j}_{A_i, B_j} + h(B) \mid A\right]\right] \quad (9)$$

$$\geq \frac{1}{2} \mathbb{E}^{p}[f(A) + \sum_{i=1}^{m} \min_{q} \mathbb{E}^{q}\left[2\sum_{j} g^{i,j}_{A_i, B_j} + \frac{1}{m}h(B) \mid A_i\right]] \quad (10)$$

$$= \frac{1}{2} \mathbb{E}^{p}[f(A) + \sum_{i=1}^{m} \min_{q} \sum_{j,j'|j' \neq j} \mathbb{E}^{q}[\frac{g^{i,j}_{A_i, B_j} + g^{i,j'}_{A_i, B_{j'}}}{n-1} + \frac{h^{j,j'}_{B_j, B_{j'}}}{m} \mid A_i]] \quad (11)$$

$$\geq \frac{1}{2} \mathbb{E}^{p}[f(A) + \sum_{i,j,j'|j' \neq j} \min_{q_{j,j'}} \mathbb{E}^{q_{j,j'}}[\frac{g^{i,j}_{A_i, B_j} + g^{i,j'}_{A_i, B_{j'}}}{n-1} + \frac{h^{j,j'}_{B_j, B_{j'}}}{m} \mid A_i]] \quad (12)$$

where $q_{j,j'}$ denotes the joint distribution of $B_j$ and $B_{j'}$. The following notation is used to simplify the above expression:

$$w^{i,j,j'}_{A_i, B_j, B_{j'}} = \frac{g^{i,j}_{A_i, B_j} + g^{i,j'}_{A_i, B_{j'}}}{n-1} + \frac{h^{j,j'}_{B_j, B_{j'}}}{m} \quad (13)$$

The above lower bound may be interpreted as follows. In the first inequality, the present invention hypothetically allows the strategies of the second team, q, to depend on the actions of the first team. In the second inequality, the present invention hypothetically allows q to vary for each agent in the first team. In the last inequality, the present invention considers the pairs of the agents in the second team, and hypothetically lets the strategies of those agents to depend on the particular pair. Allowing these dependencies give extra power to the second team, although it is impossible in reality to have such dependencies. These hypothetical settings are thus pessimistic to the first team.

Second, to avoid being too pessimistic, the present invention constrains the strategies of the second team by adding the penalty for deviating from a nominal distribution, Namely, $$\min_{q} \mathbb{E}^{p,q}[r_{A,B}] \approx \frac{1}{2} \mathbb{E}^{p}[f(A) + \sum_{i,j,j'|j' \neq j} \min_{q_{j,j'}}\left\{\mathbb{E}^{q_{j,j'}}[w^{i,j,j'}_{A_i, B_j, B_{j'}} \mid A_i] + \frac{1}{\gamma} KL(q_{j,j'} \| q_0)\right\}] \quad (14)$$

$$= \frac{1}{2} \mathbb{E}^{p}\left[f(A) + \sum_{i,j,j'|j' \neq j} ERM^{q_0}_{\gamma}\left[w^{i,j,j'}_{A_i, B_j, B_{j'}} \mid A_i\right]\right] \quad (15)$$

where $q_0$ is the nominal distribution over $\mathcal{B} \times \mathcal{B}$, the space of the joint actions of a pair of agents in the second team. So far, a hypothetical second team has been assumed who is adversarial to the first team but is constrained with a penalty with KL divergence. This is analogous to what has been assumed for the case of two players above.

Next, for each agent i in the first team, cooperative strategies are considered for the remaining agents in the first team. Specially, observe that $$\max_p \frac{1}{2} \mathbb{E}^p \left[ f(A) + \sum_{i,j,j'|j' \neq j} ERM_\gamma^{q_0} \left[ w_{A_i,B_j,B_{j'}}^{i,j,j'} \mid A_i \right] \right] \tag{16}$$

$$= \frac{1}{2} \max_p \mathbb{E}^p \left[ \sum_{i,i'|i' \neq i} f_{a_i,a_{i'}}^{i,i'} + \sum_{i,j,j'|j' \neq j} ERM_\gamma^{q_0} \left[ w_{A_i,B_j,B_{j'}}^{i,j,j'} \mid A_i \right] \right]$$

$$\leq \frac{1}{2} \sum_{i=1}^m \max_{p_i} \mathbb{E}^{p_i} [\max_{p_{-i}} \mathbb{E}^{p_{-i}} [\sum_{i'|i' \neq i} f_{A_i,A_{i'}}^{i,i'} |A_i| + \sum_{j,j'|j' \neq j} ERM_\gamma^{q_0} \left[ w_{A_i,B_j,B_{j'}}^{i,j,j'} \mid A_i \right]] \tag{17}$$

$$\leq \frac{1}{2} \sum_{i=1}^m \max_{p_i} \mathbb{E}^{p_i} \left[ \sum_{i'|i' \neq i} \max_{p_{i'}} \mathbb{E}^{p_{i'}} \left[ f_{A_i,A_{i'}}^{i,i'} |A_i| \right] + \sum_{j,j'|j' \neq j} ERM_\gamma^{q_0} \left[ w_{A_i,B_j,B_{j'}}^{i,j,j'} \mid A_i \right] \right] \tag{18}$$

Where p-i denotes the joint probability distribution over the actions of the agents in the first team except agent i. In (17), the inequality may be interpreted as allowing the agents in the first team except i to choose their strategies dependent on the action of i. Notice that such strategies are only hypothetical, since each agent in the first team is allowed to take different actions depending on who the agent is collaborating with. Also, instead of being adversarial, the agents in the team are cooperative. Hence, the inequality is now less than or equal.

Thus, to avoid being too opportunistic, the strategies of the first team are constrained by adding the penalty for deviating from a nominal distribution, $p_0$. Namely, $$\max_p \min_q \mathbb{E}^{p,q} [r_{A,B}] \approx \tag{19}$$

$$\frac{1}{2} \sum_{i=1}^m \max_{p_i} \mathbb{E}^{p_i} [\sum_{i'|i' \neq i} \max_{p_{i'}} \{\mathbb{E}^{p_{i'}} \left[ f_{A_i,A_{i'}}^{i,i'} \mid A_i \right] - \frac{1}{\beta} KL(p_{i'} \mid p_0)\} + \sum_{j,j'|j' \neq j} ERM_\gamma^{q_0} \left[ w_{A_i,B_j,B_{j'}}^{i,j,j'} \mid A_i \right]]$$

$$= \frac{1}{2} \sum_{i=1}^m \max_{p_i} \mathbb{E}^{p_i} \left[ \sum_{i'|i' \neq i} ERM_{-\beta}^{p_0} \left[ f_{A_i,A_{i'}}^{i,i'} \mid A_i \right] + \sum_{j,j'|j' \neq j} ERM_\gamma^{q_0} \left[ w_{A_i,B_j,B_{j'}}^{i,j,j'} \mid A_i \right] \right] \tag{20}$$

Finally, for each i, the present invention adds the penalty for the deviation of $p_i$ from a nominal distribution $p_0$:

$$\underset{p_i}{\mathrm{argmax}}\, \mathbb{E}^{p_i} \left[ \sum_{i'|i' \neq i} ERM_{-\beta}^{p_0} \left[ f_{A_i,A_{i'}}^{i,i'} \mid A_i \right] + \right. \tag{21}$$

$$\left. \sum_{j,j'|j' \neq j} ERM_\gamma^{q_0} \left[ w_{A_i,B_j,B_{j'}}^{i,j,j'} \mid A_i \right] \right] - \frac{1}{a} KL(p_i \| p_0)$$

As discussed above, this penalty with KL divergence makes the resulting strategy less predictable. Then the maximizer of (21) is given by $$p_i^*(a_i) = \tag{22}$$

$$\frac{p_0(a_i)}{Z} \exp\left( a (\sum_{i'|i' \neq i} ERM_{-\beta}^{p_0} \left[ f_{a_i,A_{i'}}^{i,i'} \right] + \sum_{j,j'|j' \neq j} ERM_\gamma^{q_0} \left[ w_{A_i,B_j,B_{j'}}^{i,j,j'} \right] ) \right)$$

Approaches to Choose Dependent Actions

There are three approaches to use (22), depending on what knowledge the agents in the first team can share. The first approach makes minimal assumptions and simply lets the agents independently choose actions according to (22).

The second approach assumes that the agents in the first team can make an agreement in advance about the order in which they choose strategies. Because they also share common local payoff matrices, they can infer what strategies are chosen by others if the protocol is set in advance. Alternatively, each agent may communicate its strategy to those who have not selected their strategies. Let $\underline{M_i}$ be the set of agents who choose strategies before agent i and $\overline{M_i}$ be those after i. Then agent i may choose its strategy according to the following:

$$p_i^{*2}(a_i) = \tag{23}$$

$$\frac{p_0(a_i)}{Z} \exp\left( a (\sum_{i' \in \underline{M_i}} \mathbb{E}^{p_{i'}^{*2}} \left[ f_{a_i,A_{i'}}^{i,i'} \right] + \sum_{i' \in \overline{M_i}} ERM_{-\beta}^{p_0} \left[ f_{a_i,A_{i'}}^{i,i'} \right] + \right.$$

$$\left. \sum_{j,j'|j' \neq j} ERM_\gamma^{q_0} \left[ w_{a_i,B_j,B_{j'}}^{i,j,j'} \right] ) \right)$$

The third approach assumes that the agents in the first team make decisions in sequence and can communicate the selected actions to those who have not done so. Then agent i may choose its strategy according to $$p_i^{*3}(a_i) = \frac{p_0(a_i)}{Z} \exp\left(\alpha \left(\sum_{i' \in \underline{M_i}} f_{a_i, A_{i'}}^{i,i'} + \sum_{i' \in \overline{M_i}} ERM_{-\beta}^{p_0}\left[f_{a_i, a_{i'}}^{i,i'}\right] + \sum_{j, j' | j' \neq j} ERM_\gamma^{q_0}\left[w_{a_i, B_j, B_{j'}}^{i,j,j'}\right]\right)\right) \quad (24)$$

where $a_{i'}$ has been chosen according to $p_{i'}^{*3}$ for $i' \in \underline{M_i}$.

Setting the Hyperparameters

The values of three hyperparameters $\alpha$, $\beta$, and $\gamma$ are set.

First these hyperparameters are converted into scale invariant ones, $\overline{\alpha}$, $\overline{\beta}$, and $\overline{\gamma}$, which have the following relations to the original hyperparameters:

$$\sqrt{\text{Var}^{p_0}\left[\sum_{i' | i' \neq i} ERM_{-\beta}^{p_0}\left[f_{A_i, A_{i'}}^{i,i'} \mid A_i\right]\right) + \sum_{j, j' | j' \neq j} ERM_\gamma^{q_0}\left[w_{A_i, B_j, B_{j'}}^{i,j,j'} \mid A_i\right]\right)} \quad (2\overline{\alpha})$$

$$\beta = 2\overline{\beta} \frac{\underset{i, i' | i \neq i'}{\text{average}} \mathbb{E}^{p_0}\left[\sqrt{\text{Var}^{p_0}\left[f_{A_i, A_{i'}}^{i,i'} \mid A_i\right]}\right]}{\underset{i, i' | i \neq i'}{\text{average}} \mathbb{E}^{p_0}\left[\text{Var}^{p_0}\left[f_{A_i, A_{i'}}^{i,i'} \mid A_i\right]\right]} \quad (26)$$

$$\gamma = 2\overline{\gamma} \frac{\underset{i, j, j'}{\text{average}} \mathbb{E}^{p_0}\left[\sqrt{\text{Var}^{q_0}\left[w_{A_i, B_j, B_{j'}}^{i,j,j'} \mid A_i\right]}\right]}{\underset{i, j, j'}{\text{average}} \mathbb{E}^{p_0}\left[\text{Var}^{q_0}\left[w_{A_i, B_j, B_{j'}}^{i,j,j'} \mid A_i\right]\right]} \quad (27)$$

It is recommended to set $\overline{\gamma}=1$. Likewise, it is recommended to set $\overline{\beta}=1$. A suitable value of $\alpha$ remains nontrivial, and our guideline is to choose $\overline{\alpha} \in [1, \infty]$ with consideration of the tradeoff between unpredictability and the best-case performance.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed. Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for choosing an action of an agent in a first team that competes against a second team by a multi-agent system, comprising:
   determining, by a computing device, an action, based on first, second and third types of local payoff matrices; and
   performing the action, by a hardware device operatively coupled to the computing device,
   wherein the determining step comprises:
      representing, by the first type of local payoff matrices, a payoff to the first team due to a pairwise interaction between agent teammates of the first team;
      representing, by the second type of local payoff matrices, a payoff to the first team due to a pairwise interaction between agent opponents from the first team and the second team; and
      representing, by the third type of local payoff matrices, a payoff to the first team due to a pairwise interaction between agent teammates of the second team.

2. The computer-implemented method of claim 1, wherein determining the action comprises choosing the action from a Boltzmann distribution, where the higher a risk-seeking measure of a payoff due to an interaction with teammates and the higher a risk-averse measure of a payoff due to interactions with and between opponents, the larger a negative energy of the action.

3. The computer-implemented method of claim 2, wherein the agent teammates of the first team comprise a first agent and a second agent, and wherein the first agent chooses the action so that the second agent has a risk of increasing the payoff greater than a threshold amount.

4. The computer-implemented method of claim 2, wherein the agent teammates of the first team comprise a first agent, wherein the agent teammates of the second team comprise a second and a third agent, and wherein the first agent chooses an action so that the second and third agents have a risk of decreasing the payoff greater than a threshold amount.

5. The computer-implemented method of claim 2, wherein choosing the action from the Boltzmann distribution comprises using an entropic risk measure with a risk-sensitivity parameter for a payoff due to an interaction with teammates and an entropic risk measure with a risk-sensitivity parameter for a payoff due to interactions with and between opponents.

6. The computer-implemented method of claim 5, wherein each of the risk-sensitivity parameter for a payoff due to an interaction with teammates and the risk-sensitivity parameter for a payoff due to interactions with and between opponents is determined based on a variance of conditional entropic risk measures.

7. The computer-implemented method of claim 2, wherein an inverse temperature is set to infinity.

8. The computer-implemented method of claim 1, wherein the first, second and third types of local payoff matrices are determined based on a payoff tensor $R(a_1, \ldots, a_m, b_1, \ldots, b_m)$ representing payoff to the first team when agents in the first team take actions $a_1, \ldots, a_m$ and agents in the second team take actions $b_1, \ldots, b_m$, where m is a number of agents in the first team and the second team.

9. The computer-implemented method of claim 1, wherein the method is performed by an Advanced Driver Assistance System, and agents are selected from systems that include a steering system, an accelerating system, a braking system, and a lighting system.

10. A computer-implemented method for choosing an action of an agent in a first team that competes against a second team, comprising:
  determining, by a computing device, an action based on first $F^{i,i'}(a, a')$, second $G^{i,j}(a, b)$ and third $H^{j,j'}(b, b')$ types of local payoff matrices; and
  performing the action, by a hardware device operatively coupled to the computing device,
  wherein the determining step comprises:
    representing, by the first type of local payoff matrices $F^{i,i'}(a, a')$, a first payoff to the first team due to an interaction between an agent i taking an action $a \in A$ and agent i' taking an action $a' \in A$ in the first team, with A being a set of actions that can be taken by first team agents;
    representing, by the second type of local payoff matrices $G^{i,j}(a, b)$, a second payoff to the first team due to an interaction between an agent i taking an action $a \in A$ in the first team and an agent j taking an action $b \in B$ in the second team, with B being a set of actions that can be taken by second team agents; and
    representing, by the third type of local payoff matrices $H^{j,j'}(b, b')$, a third payoff to the first team due to an interaction between an agent j taking an action $b \in B$ and agent j' taking an action $b' \in B$ in the second team.

11. The computer-implemented method of claim 10, wherein determining the action comprises choosing the action a from a Boltzmann distribution, $p(a) \sim \exp(\alpha E(a))$, where the higher a risk-seeking measure of $F^{i,i'}(a, A')$ and the higher a risk-averse measure of $G^{i,j}(a, B)$, $G^{i,j}(a, B')$, and $H^{j,j'}(B, B')$, the larger a negative energy $E(a)$ of a, with A' being an action of a teammate, and each of B and B' being an action of an opponent.

12. The computer-implemented method of claim 11, wherein the agent i chooses an action so that agent i' has a risk of increasing the payoff greater than a threshold amount.

13. The computer-implemented method of claim 11, wherein the agent i chooses an action so that agent j and agent j' have a risk of decreasing the payoff greater than a threshold amount.

14. The computer-implemented method of claim 11, wherein choosing the action a from the Boltzmann distribution comprises using an entropic risk measure with a risk-sensitivity parameter $\beta$ for $F^{i,i'}(a, A')$ and an entropic risk measure with a risk-sensitivity parameter $\gamma$ for $G^{i,j}(a, B)$, $G^{i,j}(a, B')$, and $H^{j,j'}(B, B')$.

15. The computer-implemented method of claim 14, wherein each of the parameters $\beta$ and $\gamma$ is determined based on a variance of conditional entropic risk measures.

16. The computer-implemented method of claim 11, wherein an inverse temperature $\alpha$ is set to infinity.

17. The computer-implemented method of claim 10, wherein the first, second and third types of local payoff matrices are determined based on a payoff tensor $R(a_1, \ldots, a_m, b_1, \ldots, b_m)$ representing payoff to the first team when agents in the first team take actions $a_1, \ldots, a_m$ and agents in the second team take actions $b_1, \ldots, b_m$, where m is a number of agents in the first team and the second team.

18. The computer-implemented method of claim 10, wherein the method is performed by an Advanced Driver Assistance System, and agents are selected from systems that include a steering system, an accelerating system, and a braking system.

19. A computer program product for choosing an action of an agent in a first team that competes against a second team by a multi-agent system, the computer program product comprising a computer readable storage medium having program instructions embodied therewith, the program instructions executable by a computer to cause the computer to perform a method comprising:
  determining, by the computer, an action, based on first, second and third types of local payoff matrices; and
  performing the action, by a hardware device operatively coupled to the computer, wherein the determining step comprises:
    representing, by the first type of local payoff matrices, a payoff to the first team due to a pairwise interaction between agent teammates of the first team;
    representing, by the second type of local payoff matrices, a payoff to the first team due to a pairwise interaction between agent opponents from the first team and the second team; and
    representing by the third type of local payoff matrices, a payoff to the first team due to a pairwise interaction between agent teammates of the second team.

20. A computer program product for choosing an action of an agent in a first team that competes against a second team by a reinforcement learning system, the computer program product comprising a computer readable storage medium having program instructions embodied therewith, the program instructions executable by a computer to cause the computer to perform a method comprising:
  determining, by a computing device, an action based on first $F^{i,i'}(a, a')$, second $G^{i,j}(a, b)$ and third $H^{j,j'}(b, b')$ types of local payoff matrices; and
  performing the action, by a hardware device operatively coupled to the computing device,
  wherein the determining step comprises:
    representing, by the first type of local payoff matrices $F^{i,i'}(a, a')$, a first payoff to the first team due to an interaction between an agent i taking an action $a \in A$ and agent i' taking an action $a' \in A$ in the first team, with A being a set of actions that can be taken by first team agents;
    representing, by the second type of local payoff matrices $G^{i,j}(a, b)$, a second payoff to the first team due to an interaction between an agent i taking an action $a \in A$ in the first team and an agent j taking an action $b \in B$ in the second team, with B being a set of actions that can be taken by second team agents; and
    representing, by the third type of local payoff matrices $H^{j,j'}(b, b')$, a third payoff to the first team due to an interaction between an agent j taking an action b∈B and agent j' taking an action b'∈B in the second team.

21. A computer processing system for choosing an action of an agent in a first team that competes against a second team by a multi-agent system, comprising:
a memory for storing program code; and
a processor device for running the program code to:
  determine an action based on first $F^{i,i'}(a, a')$, second $G^{i,j}(a, b)$ and third $H^{j,j'}(b, b')$ types of local payoff matrices; and
  send instructions to a hardware device operating coupled to the computer processing system to control the hardware device to perform the action,
wherein the processor device further runs the program code to:
  represent, by the first type of local payoff matrices $F^{i,i'}(a, a')$, a first payoff to the first team due to an interaction between an agent i taking an action a∈A and agent i' taking an action a'∈A in the first team, with A being a set of actions that can be taken by first team agents;
  represent, by the second type of local payoff matrices $G^{i,j}(a, b)$, a second payoff to the first team due to an interaction between an agent i taking an action a∈A in the first team and an agent j taking an action b∈B in the second team, with B being a set of actions that can be taken by second team agents; and
  represent, by the third type of local payoff matrices $H^{j,j'}(b, b')$, a third payoff to the first team due to an interaction between an agent j taking an action b∈B and agent j' taking an action b'∈B in the second team.

22. The computer processing system of claim 21, wherein determining the action comprises choosing the action a from a Boltzmann distribution, $p(a) \sim \exp(\alpha E(a))$, where the higher a risk-seeking measure of $F^{i,i'}(a, A')$ and the higher a risk-averse measure of $G^{i,j}(a, B)$, $G^{i,j'}(a, B')$, and $H^{j,j'}(B, B')$, the larger a negative energy $E(a)$ of a, with A' being an action of a teammate, and each of B and B' being an action of an opponent.

23. The computer processing system of claim 22, wherein the agent i chooses an action so that agent i' has a risk of increasing the payoff greater than a threshold amount.

24. The computer processing system of claim 22, wherein the agent i chooses an action so that agent j and agent j' have a risk of decreasing the payoff greater than a threshold amount.

25. The computer processing system of claim 22, wherein choosing the action a from the Boltzmann distribution comprises using an entropic risk measure with a risk-sensitivity parameter β for $F^{i,i'}(a, A')$ and an entropic risk measure with a risk-sensitivity parameter γ for $G^{i,j}(a, B)$, $G^{i,j'}(a, B')$, and $H^{j,j'}(B, B')$.

* * * * *